United States Patent [19]
Saeki et al.

[11] Patent Number: 6,051,955
[45] Date of Patent: *Apr. 18, 2000

[54] PROTECTION CIRCUIT AND BATTERY UNIT

[75] Inventors: Mitsuo Saeki; Hidekiyo Ozawa; Toshiaki Tsukuni; Yoshiro Takeda, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/982,937

[22] Filed: Dec. 1, 1997

[30] Foreign Application Priority Data

May 19, 1997 [JP] Japan ................................... 9-128915

[51] Int. Cl.$^7$ .................................................. H02J 7/00
[52] U.S. Cl. ........................................... 320/121; 320/120
[58] Field of Search ................... 320/117, 119, 320/121, 122, 162

[56] References Cited

U.S. PATENT DOCUMENTS

| | | | |
|---|---|---|---|
| 5,302,902 | 4/1994 | Groehl | 320/DIG. 13 |
| 5,304,915 | 4/1994 | Sanpei et al. | 320/116 |
| 5,547,775 | 8/1996 | Eguchi et al. | 320/118 |
| 5,602,481 | 2/1997 | Fukuyama | 324/434 |
| 5,610,495 | 3/1997 | Yee et al. | 320/116 |
| 5,617,010 | 4/1997 | Higashijima et al. | 320/134 |
| 5,652,501 | 7/1997 | McClure et al. | 320/118 |

FOREIGN PATENT DOCUMENTS

| | | |
|---|---|---|
| 0 432 639 | 6/1991 | European Pat. Off. . |
| 0 721 247 | 7/1996 | European Pat. Off. . |
| 0 731 545 | 9/1996 | European Pat. Off. . |
| 42 31 732 | 3/1996 | Germany . |
| 61-133583 | 6/1986 | Japan . |
| 0 566 386 | 10/1993 | Japan . |
| 7-255134 | 10/1995 | Japan . |
| 8-50902 | 2/1996 | Japan . |
| 2 292 845 | 3/1996 | United Kingdom . |
| 95/30905 | 11/1995 | WIPO . |

OTHER PUBLICATIONS

"Gestion De Patteries Lithium–Ion" Electronique, No. 56, Feb. 1, 1996, p. 80.

Primary Examiner—Edward H. Tso
Assistant Examiner—Lawrence Luk
Attorney, Agent, or Firm—Staa & Halsey LLP

[57] ABSTRACT

A protection circuit is used for a battery unit which has a plurality of cell parts coupled in parallel, and first and second power supplying terminals, where each of the cell parts includes a plurality of battery cells coupled in series, and first and second terminals respectively coupled to the first and second power supplying terminals. The protection circuit includes a plurality of switching elements making an electrical connection to the first terminal of a corresponding one of the cell parts and the first power supplying terminal, and disconnecting the electrical connection in response to an active signal, and a voltage monitoring circuit outputting the active signal to the switching elements when a voltage of at least one battery cell within one cell part falls outside a predetermined range, independently with respect to each of the cell parts.

46 Claims, 12 Drawing Sheets

PROTECTION CIRCUIT AND BATTERY UNIT

BACKGROUND OF THE INVENTION

The present invention generally relates to protection circuits and battery units, and more particularly to a protection circuit and a battery unit which prevent excessive discharge and excessive charging of a battery.

Recently, in portable electronic equipments typified by notebook type personal computers (or lap-top computers) and the like, lithium ion ($Li^+$) batteries or the like are replacing nickel cadmium (NiCd) batteries, nickel metal hydrogen (NiMH) batteries and the like. Compared to the NiCd battery, the NiMH battery and the like, the $Li^+$ battery is lighter and has a greater capacity per unit volume. Accordingly, the $Li^+$ battery is suited for use in equipments which must satisfy demands such as light weight and continuous use for a long period of time.

In the battery unit which is used in the portable electronic equipment or the like, a plurality of battery cells are connected in series due to an output voltage that can be output from a single battery cell. A maximum number of battery cells that can be connected in series within the battery unit is determined by the relationship of an output voltage of the battery unit and a power supply voltage that is supplied from the outside when charging the battery unit. For example, the output voltage of one NiCd battery cell or a NiMH battery cell is 1.2 V, and the power supply voltage that is supplied when charging the battery unit is approximately 1.7 V. When a withstand voltage of parts of a power supply system of the general portable electronic equipment or the like, an input voltage of an A.C. adapter and the like are taken into consideration, the battery unit is most conveniently used when the output voltage of the battery unit is approximately 16.0 V, and in the case where the NiCd battery cells or the NiMH battery cells are used, the maximum number of battery cells that can be connected in series within the battery unit is nine. On the other hand, the output voltage of a single $Li^+$ battery cell is approximately 4.2 V at the maximum. Accordingly, the maximum number of $Li^+$ battery cells that can be connected in series within the battery unit is approximately three.

Unlike the NiCd battery unit or the NiMH battery unit, the $Li^+$ battery unit is provided with a protection function against short-circuits outside the $Li^+$ battery unit and short-circuits within the $Li^+$ battery unit. Because the capacity of the $Li^+$ battery unit per unit volume is large, energy is discharged within a short time if the output of the $Li^+$ battery unit is short-circuited for some reason or a short-circuit occurs within the $Li^+$ battery unit for some reason, and in such cases, there is a possibility of the $Li^+$ battery unit becoming deteriorated or the serviceable life of the $Li^+$ battery unit becoming shortened. Hence, the protection function is provided for this reason. Accordingly, even if a short-circuit occurs outside or inside the $Li^+$ battery unit, an excessive discharge current or an excessive charging current is cut off by a fuse or the like when the charging current or the discharge current becomes greater than a predetermined value, thereby preventing deterioration of the $Li^+$ battery unit and securing the serviceable life of the $Li^+$ battery unit.

On the other hand, the capacity of each battery cell within the battery unit is determined by a basic capacity which is based on the size of the battery unit. Hence, in order to increase the capacity of the battery unit, it becomes necessary to connect a plurality of battery cells in parallel, and to connect such parallel connections in series.

FIG. 1 is a circuit diagram showing an example of a conventional battery unit, and FIG. 2 is a circuit diagram showing the construction of a voltage monitoring circuit within the battery unit shown in FIG. 1.

In FIG. 1, a battery unit 100 generally includes battery cells E11, E12, E21, E22, E31 and E32, a voltage monitoring circuit 101, a fuse 102, P-channel field effect transistors (FETs) 103 and 104, and power supply terminals 105 and 106 which are connected as shown. The battery cells E11 and E12 are connected in parallel, the battery cells E21 and E22 are connected in parallel, and the battery cells E31 and E32 are connected in parallel. In addition, the parallel connection of the battery cells E11 and E12, the parallel connection of the battery cells E21 and E22, and the parallel connection of the battery cells E31 and E32 are connected in series.

The voltage monitoring circuit 101 monitors the voltages of the parallel connection of the battery cells E11 and E12, the parallel connection of the battery cells E21 and E22, and the parallel connection of the battery cells E31 and E32, and detects an excessive discharge state in the discharging state of the battery unit 100 if the voltage of one of the parallel connections of the battery cells becomes less than a predetermined value. When the excessive discharge state is detected, the voltage monitoring circuit 101 turns OFF the FET 103 so as to cut off the discharge current from the battery unit 100 and to prevent the excessive discharge. On the other hand, the voltage monitoring circuit 101 monitors the voltages of the parallel connection of the battery cells E11 and E12, the parallel connection of the battery cells E21 and E22, and the parallel connection of the battery cells E31 and E32, and detects an excessive charging state in the charging state of the battery unit 100 if the voltage of one of the parallel connections of the battery cells becomes greater than a predetermined value. When the excessive charging state is detected, the voltage monitoring circuit 101 turns OFF the FET 104 so as to cut off the charging current to the battery unit 100 and to prevent the excessive charging.

The fuse 102 melts and breaks the connection when a current greater than a predetermined value flows through the fuse, so as to cut off the current flow. As a result, even if the operation of cutting off the excessive current by the voltage monitoring circuit 101 does not function correctly or the operation of cutting off the excessive current does not function correctly due to a failure such as short-circuiting of the FETs 103 and 104 themselves, the fuse 102 melts and breaks the connection to provide a double protection circuit.

The voltage monitoring circuit 101 includes comparator circuits 111 through 113 and 121 through 123, and logical sum (OR) circuits 114 and 124 which are connected as shown in FIG. 2. In FIG. 2, e1 and e2 respectively denote reference voltages indicating an excessive discharge limit voltage and an excessive charging limit voltage of the battery cells E11 through E32.

Generally, the conventional battery unit is made up of a single battery unit or a plurality of battery cells connected in series, and for this reason, no special consideration is given with respect to a case where the battery cells are connected in parallel. However, as the number of battery cells provided within the battery unit increases, although the possibility of a short-circuit occurring within the battery unit due to an abnormality generated in a battery cell is extremely small, the possibility is not zero. For this reason, when a plurality of battery cells are connected in parallel and such parallel connections are connected in series within the battery unit in order to increase the capacity of the battery unit, a current which flows through the battery cell in which the abnormality is generated becomes an integral multiple of that during a normal state, where the integral multiple corresponds to the number of battery cells connected in parallel within the parallel connection. As a result, there was a problem in that considerable deterioration and considerable shortening of the serviceable life occurs when the above described abnormality occurs in the Li$^+$ battery unit having such parallel connections.

For example, in the case of the battery unit 100 shown in FIGS. 1 and 2, if an internal short-circuiting occurs in the battery cell E11 which is connected in parallel with the battery cell E12, the energy stored in the battery cell E11 is consumed instantaneously, and the current from the other battery cell E12, which is connected in parallel with the battery cell E11, also flows to the battery cell E11. In other words, a current which is an integral multiple (in this case, two times) of that during the normal state is instantaneously consumed by the battery cell E11, and there is a possibility that the battery unit 100 as a whole will deteriorate and the serviceable life of the battery unit 100 will become shortened.

SUMMARY OF THE INVENTION

Accordingly, it is a general object of the present invention to provide a novel and useful protection circuit and battery unit, in which the problems described above are eliminated.

Another and more specific object of the present invention is to provide a protection unit and a battery unit which can positively prevent deterioration and shortening of the serviceable life of the battery unit even if a short-circuit occurs within the battery unit, so that the reliability of the battery unit is improved.

Still another object of the present invention is to provide a protection circuit for use with a battery unit which has a plurality of cell parts coupled in parallel, and first and second power supplying terminals, each of the cell parts including a plurality of battery cells coupled in series, and first and second terminals respectively coupled to the first and second power supplying terminals, which protection circuit comprises a plurality of switching elements making an electrical connection to the first terminal of a corresponding one of the cell parts and the first power supplying terminal, and disconnecting the electrical connection in response to an active signal, and a voltage monitoring circuit outputting the active signal to the switching elements when a voltage of at least one battery cell within one cell part falls outside a predetermined range, independently with respect to each of the cell parts. According to the protection circuit of the present invention, it is possible to prevent deterioration of the battery unit and to prevent the serviceable life of the battery unit from becoming short, even if a short-circuit occurs outside or inside the battery unit.

A further object of the present invention is provide a battery unit comprising a plurality of cell parts coupled in parallel, each having first and second terminals and a plurality of battery cells which are coupled in series, a first power supplying terminal coupled to the first terminal of each of the cell parts, a second power supplying terminal coupled to the second terminal of each of the cell parts, a plurality of switching elements making an electrical connection to the first terminal of a corresponding one of the cell parts and the first power supplying terminal, and disconnecting the electrical connection in response to an active signal, and a voltage monitoring circuit outputting the active signal to the switching elements when a voltage of at least one battery cell within one cell part falls outside a predetermined range, independently with respect to each of the cell parts. According to the battery unit of the present invention, it is possible to prevent deterioration of the battery unit and to prevent the serviceable life of the battery unit from becoming short, even if a short-circuit occurs outside or inside the battery unit.

Other objects and further features of the present invention will be apparent from the following detailed description when read in conjunction with the accompanying drawings.

DESCRIPTION OF THE PREFERRED EMBODIMENTS

Figure 3:
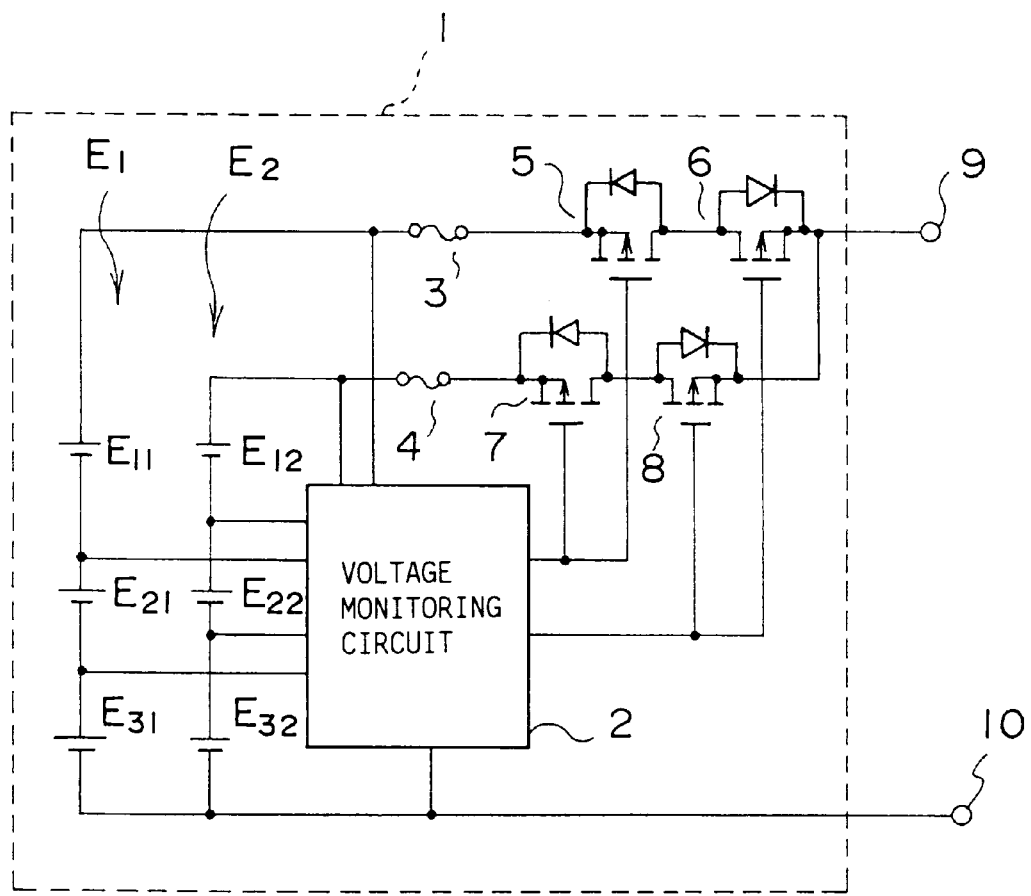
FIG. 3 is a circuit diagram showing the construction of a battery unit according to the present invention.

FIG. 3 is a circuit diagram for explaining a protection circuit according to the present invention and a battery unit according to the present invention.

In the protection circuit according to the present invention, a plurality of cell parts E1 and E2 are connected in parallel, where each cell part is made up of a plurality of battery cells connected in series. The cell part E1 is made up of battery cells E11, E21 and E31 which are connected in series, and the cell part E2 is made up of battery cells E12, E22 and E32 which are connected in series. With respect to a battery unit 1 having first and second power supplying terminals 9 and 10 which are connected to first and second terminals of each of the cell parts E1 and E2, the protection circuit is provided with a plurality of switching elements 5 through 8 and a voltage monitoring circuit 2. The switching elements 5 and 6 electrically couple the first terminal of the cell part E1 to the first power supplying terminal 9, and the switching elements 7 and 8 electrically couple the first terminal of the cell part E2 to the first power supplying terminal 9. The switching elements 5 through 8 disconnect the electrical coupling in response to an active signal. The voltage monitoring circuit 2 outputs an active signal to the corresponding switching elements when the voltage of at least one battery cell within the cell part falls outside a predetermined range, independently with respect to the cell parts E1 and E2.

On the other hand, the battery unit 1 according to the present invention includes the plurality of cell parts E1 and E2 which are connected in parallel, the first and second power supplying terminals 9 and 10, the switching elements 5 through 8, and the voltage monitoring circuit 2 are provided as shown in FIG. 3. Each of the cell parts E1 and E2 has the first and second terminals. The cell part E1 includes the plurality of battery cells E11, E21 and E31 which are connected in series, and the cell part E2 includes the plurality of battery cells E12, E22 and E32 which are connected in series. The first power supplying terminal 9 is coupled to the first terminals of each of the cell parts E1 and E2, and the second power supplying terminal 10 is coupled to the second terminals of each of the cell parts E1 and E2. The switching elements 5 and 6 electrically couple the first terminal of the cell part E1 to the first power supplying terminal 9, and the switching elements 7 and 8 electrically couple the first terminal of the cell part E2 to the first power supplying terminal 9. The switching elements 5 through 8 disconnect the electrical coupling in response to an active signal. The voltage monitoring circuit 2 outputs an active signal to the corresponding switching elements when the voltage of at least one battery cell within the cell part falls outside a predetermined range, independently with respect to the cell parts E1 and E2.

Therefore, even if a short-circuit occurs outside or inside the battery unit 1, it is possible to positively prevent deterioration and shortening of the serviceable life of the battery cells E11 through E32 within the battery unit 1, thereby improving the reliability of the battery unit 1.

Figure 4:
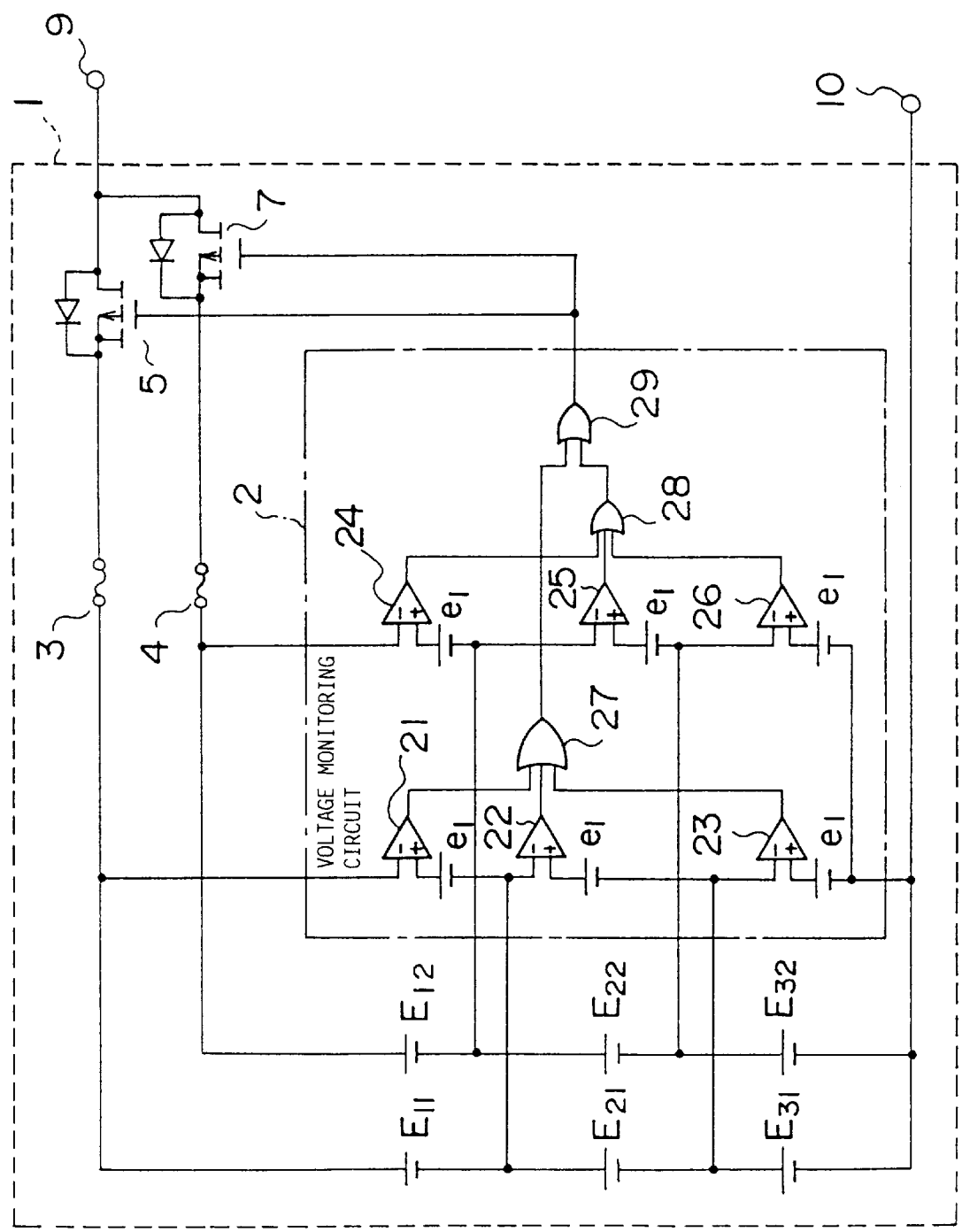
FIG. 4 is a circuit diagram showing a part of a first embodiment of the battery unit according to the present invention.
Figure 5:
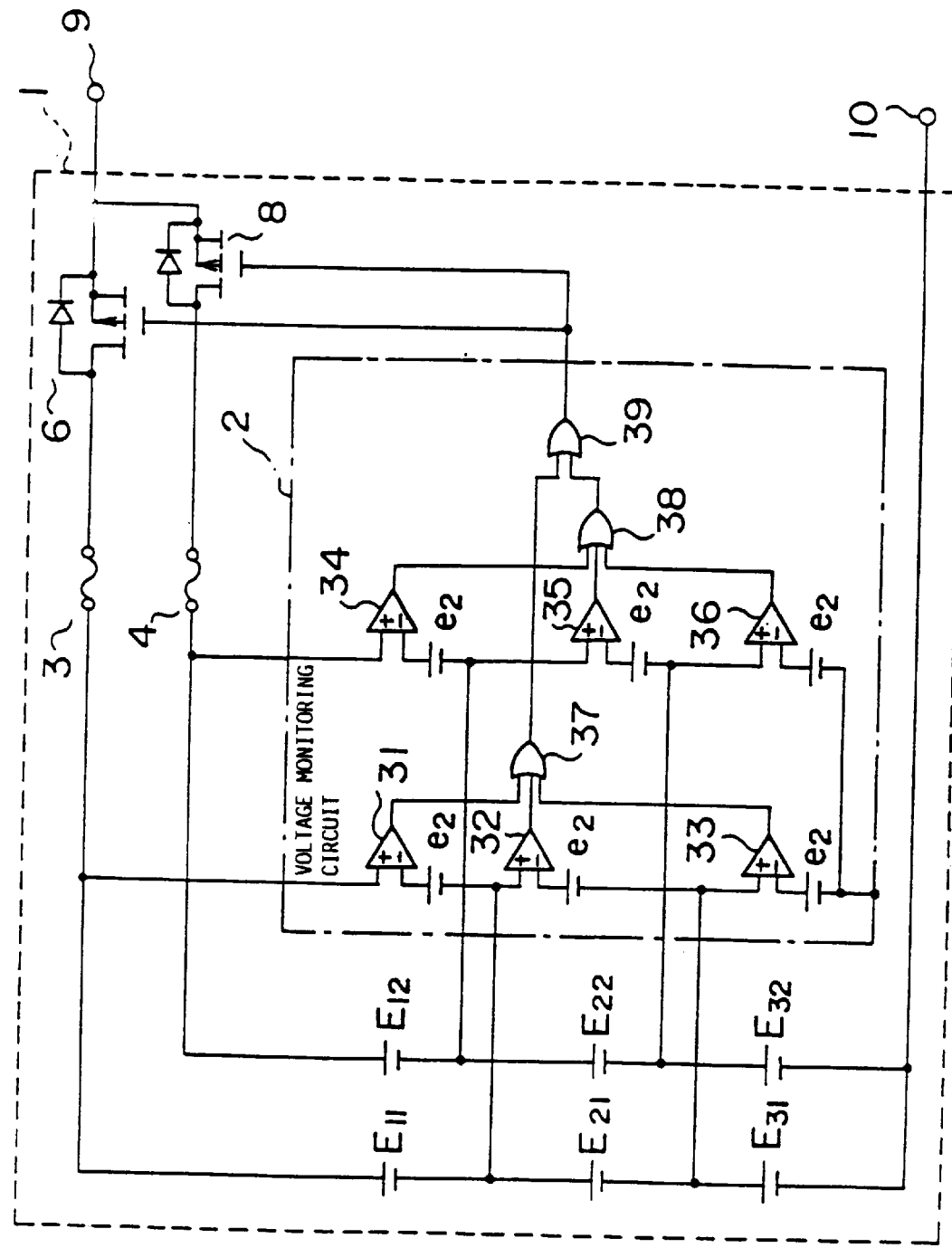
FIG. 5 is a circuit diagram showing a part of the first embodiment of the battery unit according to the present invention.

FIGS. 4 and 5 are circuit diagrams for explaining a first embodiment of the battery unit according to the present invention. This first embodiment of the battery unit employs a first embodiment of the protection circuit according to the present invention. FIG. 4 shows the battery unit together with an excessive discharge preventing system of a voltage monitoring circuit, and FIG. 5 shows the battery unit together with an excessive charging preventing system of the voltage monitoring circuit.

In FIGS. 4 and 5, those parts which are the same as those corresponding parts in FIG. 3 are designated by the same reference numerals.

In FIGS. 4 and 5, a battery unit 1 generally includes Li+ battery cells E11, E12, E21, E22, E31 and E32, a voltage monitoring circuit 2, fuses 3 and 4, P-channel FETs 5 through 8, and power supplying terminals 9 and 10 which are connected as shown. The battery cells E11, E21 and E31 are connected in series to form a series connection, and this series connection has one end coupled to the power supplying terminal 9 via the fuse 3 and the FETs 5 and 6, and another end coupled to the power supplying terminal 35 10. The battery cells E12, E22 and E32 are connected in series to form a series connection, and this series connection has one end coupled to the power supplying terminal 9 via the fuse 4 and the FETs 7 and 8, and another end coupled to the power supplying terminal 10.

The voltage monitoring circuit 2 monitors 5 the voltages of the battery cells E11, E12, E21, E22, E31 and E32, and when the voltage of one of the battery cells becomes less than a predetermined value in the discharge state of the battery unit 1, the voltage monitoring circuit 2 detects the excessive discharge state and turns OFF the FETs 5 and 7, so as to cut off the discharge current from the battery unit 1 and to prevent the excessive discharge. On the other hand, the voltage monitoring circuit 2 monitors the voltages of the battery cells E11, E12, E21, E22, E31 and E32, and when the voltage of one of the battery cells becomes greater than a predetermined value in the charging state of the battery unit 1, the voltage monitoring circuit 2 detects the excessive charging state and turns OFF the FETs 6 and 8, so as to cut off the charging current to the battery unit 1 and to prevent the excessive charging.

The fuses 3 and 4 melt and break the connection when a current greater than a predetermined value flows through these fuses 3 and 4, so as to cut off the current flow. Hence, even if the operation of cutting off the excessive current by the voltage monitoring circuit 2 does not function correctly or the operation of cutting off the excessive current does not function correctly due to a failure such as short-circuiting of the FETs 5 and 8 themselves, the fuses 3 and 4 melt and break the connection to provide a double protection circuit.

In FIG. 4, the excessive discharge preventing system of the voltage monitoring circuit 2 generally includes comparator circuits 21 through 26, and OR circuits 27 through 29 which are connected as shown. A reference voltage e1 indicates the excessive discharge limit voltage of the battery cells E11 through E32. Accordingly, if the voltage of one of the battery cells E11, E21 and E31 becomes less than or equal to the reference voltage e1, a high-level signal is applied to the FETs 5 and 7 via the OR circuits 27 and 29 to turn the FETs 5 and 7 OFF, so as to cut off the discharge current from the battery unit 1 and to prevent the excessive discharge. Similarly, if the voltage of one of the battery cells E12, E22 and E32 becomes less than or equal to the reference voltage e1, a high-level signal is applied to the FETs 5 and 7 to turn the FETs 5 and 7 OFF, so as to cut off the discharge current from the battery unit 1 and to prevent the excessive discharge.

On the other hand, if the voltages of each of the battery cells E11, E21, E31, E12, E22 and E32 are greater than the reference voltage e1, a low-level signal is applied to the FETs 5 and 7 via the OR circuits 27, 28 and 29 to turn the FETs 5 and 7 ON. Hence, the discharge current from the battery unit 1 flows to the power supplying terminals 9 and 10, and the discharge of the battery unit 1 is enabled.

In FIG. 5, the excessive charging preventing system of the voltage monitoring circuit 2 generally includes comparator circuits 31 through 36, and OR circuits 37 through 39 which are connected as shown. A reference voltage e2 indicates an excessive charging limit voltage of the battery cells E11 through E32. Accordingly, if the voltage of one of the battery cells E11, E21 and E31 becomes greater than or equal to the reference voltage e2, a high-level signal is applied to the FETs 6 and 8 via the OR circuits 37 and 39 to turn the FETs 6 and 8 OFF, so as to cut off the charging current to the battery unit 1 and to prevent the excessive charging. Similarly, if the voltage of one of the battery cells E12, E22 and E32 becomes greater than or equal to the reference voltage e2, a high-level signal is applied to the FETs 6 and 8 via the OR circuits 38 and 39 to turn the FETs 6 and 8 OFF, so as to cut off the charging current to the battery unit 1 and to prevent the excessive charging.

On the other hand, if the voltages of the battery cells E11, E21, E31, E12, E22 and E32 are less than the reference voltage e2, a low-level signal is applied to the FETs 6 and 8 via the OR circuits 37, 38 and 39 to turn the FETs 6 and 8 ON. Hence, the charging current to the battery unit 1 flows to the battery cells E11, E21, E31, E12, E22 and E32 via the power supplying terminals 9 and 10, and the charging of the battery unit 1 is enabled.

Therefore, according to this embodiment, even if an arbitrary battery cell within the battery unit 1 is short-circuited for some reason, the voltage of this arbitrary battery cell will decrease to a voltage less than or equal to the excessive discharge voltage. In other words, in the case shown in FIG. 4, out of the voltages of the battery cells input to the comparator circuits 21 through 26, the voltage of the arbitrary battery cell becomes less than or equal to the reference voltage e1, and the FETs 5 and 7 are turned OFF in response to the high-level signal from the OR circuit 29, thereby preventing the excessive discharge from the battery unit 1. As a result, although power consumption occurs within the arbitrary battery cell which is short-circuited, no current will flow to this arbitrary battery cell from the other battery cells.

Figure 6:
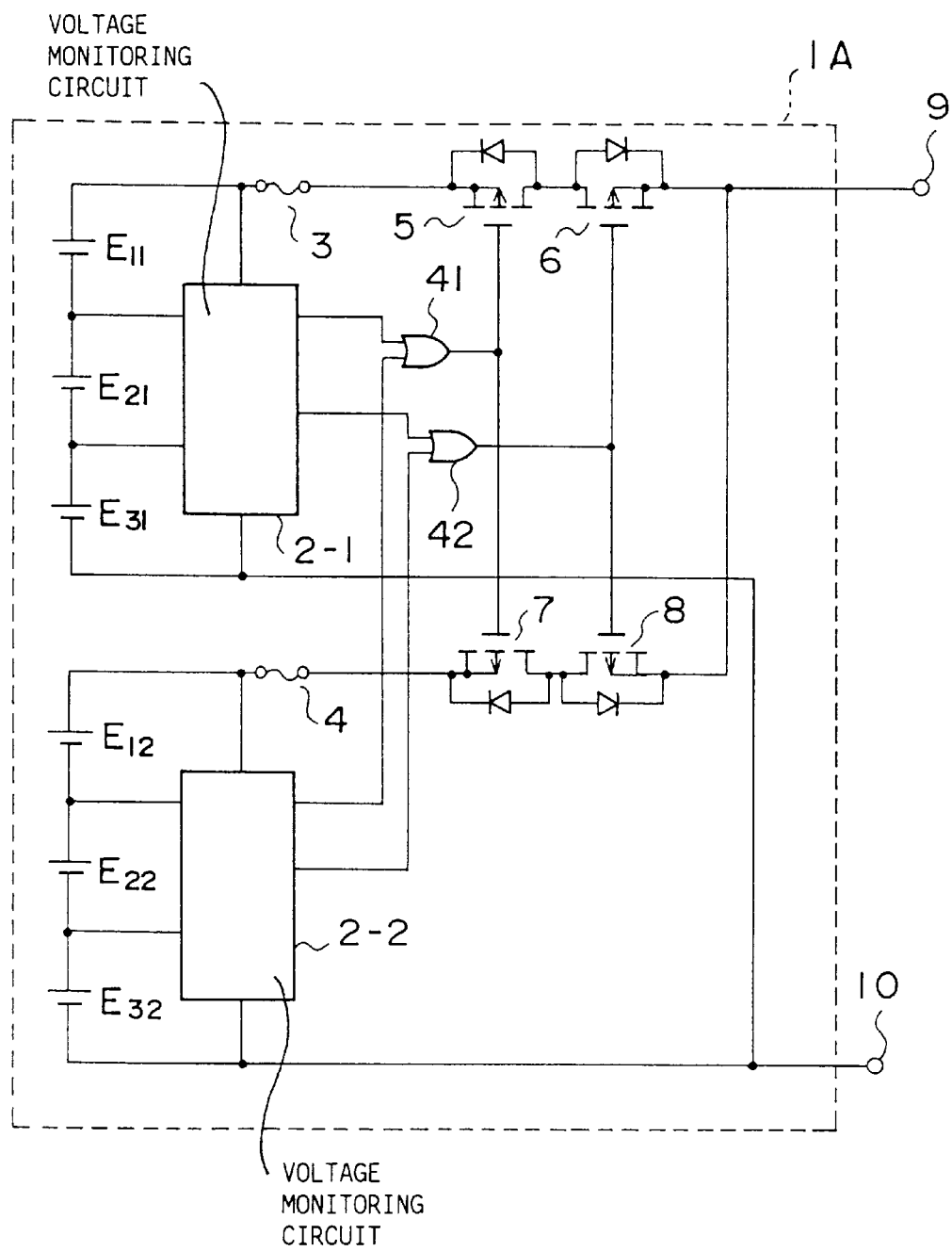
FIG. 6 is a circuit diagram showing a second embodiment of the battery unit according to the present invention.

Next, a description will be given of a second embodiment of the battery unit according to the present invention, by referring to FIG. 6. This second embodiment of the battery unit employs a second embodiment of the protection circuit according to the present invention. In FIG. 6, those parts which are the same as those corresponding parts in FIG. 3 are designated by the same reference numerals, and a description thereof will be omitted.

Figure 2:
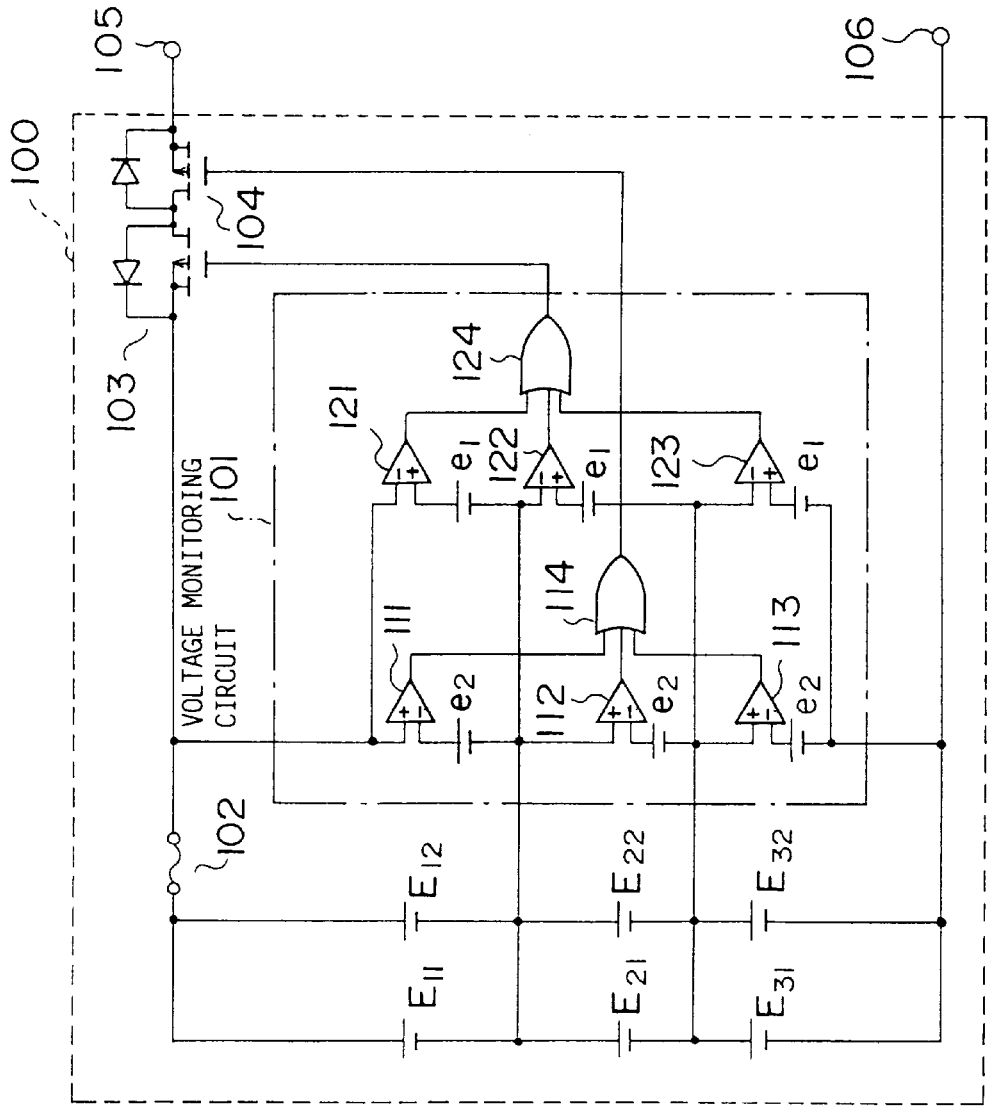
FIG. 2 is a circuit diagram showing the construction of a voltage monitoring circuit within the battery unit shown in FIG. 1.

In FIG. 6, each of voltage monitoring circuits 2-1 and 2—2 has the same construction as the voltage monitoring circuit 101 shown in FIG. 2. Hence, it is possible to form the protection circuit at a low cost by utilizing an existing voltage monitoring circuit. For example, the voltage monitoring circuits 2-1 and 2—2 are made up of an integrated circuit (IC) chip MM1309 manufactured by Mitsumi Electric Co., Ltd. of Japan. An output of an OR circuit 124 within the voltage monitoring circuit 2-1 and an output of an OR circuit 124 within the voltage monitoring circuit 2—2 are supplied to an OR circuit 41, and the FETs 5 and 7 are controlled by an output of the OR circuit 41. In addition, an output of an OR circuit 114 within the voltage monitoring circuit 2-1 and an output of an OR circuit 114 within the voltage monitoring circuit 2—2 are supplied to an OR circuit 42, and FETs 6 and 8 are controlled by an output of the OR circuit 42.

When the voltage of one of the battery cells E11, E21 and E31 becomes less than or equal to the reference voltage e1, a high-level signal is applied to the FETs 5 and 7 via the OR circuit 124 within the voltage monitoring circuit 2-1 and the OR circuit 41, thereby turning the FETs 5 and 7 OFF and preventing the excessive discharge by cutting off a discharge current from a battery unit 1A. Similarly, when the voltage of one of the battery cells E12, E22 and E32 becomes less than or equal to the reference voltage e1, a high-level signal is applied to the FETs 5 and 7 via the OR circuit 124 within the voltage monitoring circuit 2—2 and the OR circuit 41, thereby turning the FETs 5 and 7 OFF and preventing the excessive discharge by cutting off the discharge current from the battery unit 1A.

On the other hand, when the voltage of one of the battery cells E11, E21, E31, E12, E22 and E32 becomes greater than the reference voltage e1, a low-level signal is applied to the FETs 5 and 7 via the OR circuit 41, thereby turning the FETs 5 and 7 ON. As a result, the discharge current from the battery unit 1A flows to the power supplying terminals 9 and 10, and the discharge of the battery unit 1A is enabled.

In addition, when the voltage of one of the battery cells E11, E21 and E31 becomes greater than or equal to the reference voltage e2, a hi-level signal is applied to the FETs 6 and 8 via the OR circuit 114 within the voltage monitoring circuit 2-1 and the OR circuit 42, thereby turning the FETs 6 and 8 OFF and preventing the excessive charging by cutting off a charging current to the battery unit 1A. Similarly, when the voltage of one of the battery cells E12, E22 and E32 becomes greater than or equal to the reference voltage e2, a high-level signal is applied to the FETs 6 and 8 via the OR circuit 114 within the voltage monitoring circuit 2—2 and the OR circuit 42, thereby turning the FETs 6 and 8 OFF and preventing the excessive charging by cutting off the charging current to the battery unit 1A.

On the other hand, when the voltage of one of the battery cells E11, E21, E31, E12, E22 and E32 becomes less than the reference voltage e2, a low-level signal is applied to the FETs 6 and 8 via the OR circuit 42, thereby turning the FETs 6 and 8 ON. As a result, the charging current to the battery unit 1A flows to the battery cells E11, E21, E31, E12, E22 and E32 via the power supplying terminals 9 and 10, and the charging of the battery unit 1A is enabled.

Figure 7:
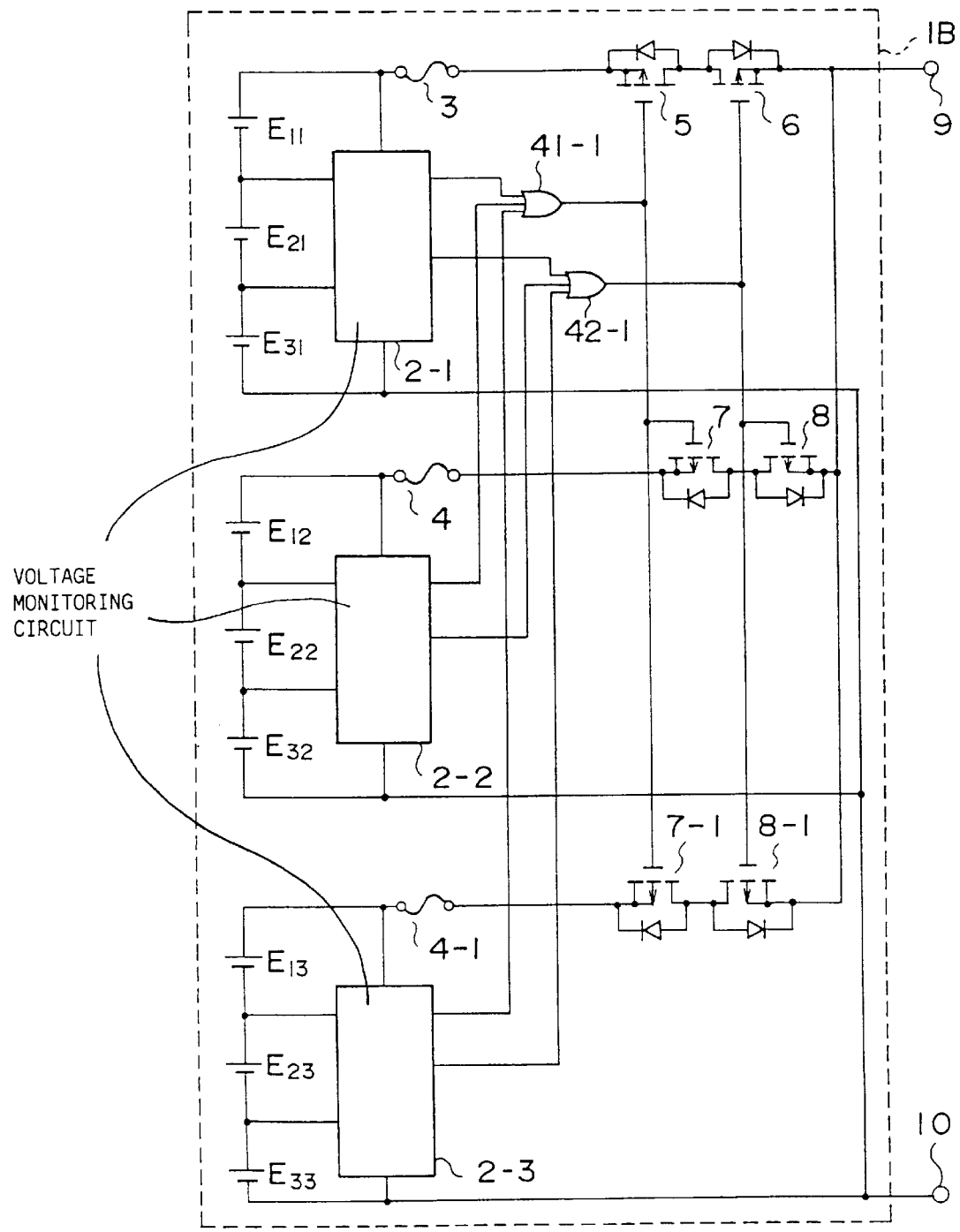
FIG. 7 is a circuit diagram showing a third embodiment of the battery unit according to the present invention.

Next, a description will be given of a third embodiment of the battery unit according to the present invention, by referring to FIG. 7. This third embodiment of the battery unit employs a third embodiment of the protection circuit according to the present invention. In FIG. 7, those parts which are the same as those corresponding parts in FIG. 6 are designated by the same reference numerals, and a description thereof will be omitted.

In FIG. 7, battery cells E11, E21 and E31 are connected in series to form a series connection, battery cells E12, E22 and E32 are connected in series to form a series connection, and battery cells E13, E23 and E33 are connected in series to form a series connection. In addition, these series connections of the battery cells are connected in parallel between the power supplying terminals 9 and 10.

Figure 1:
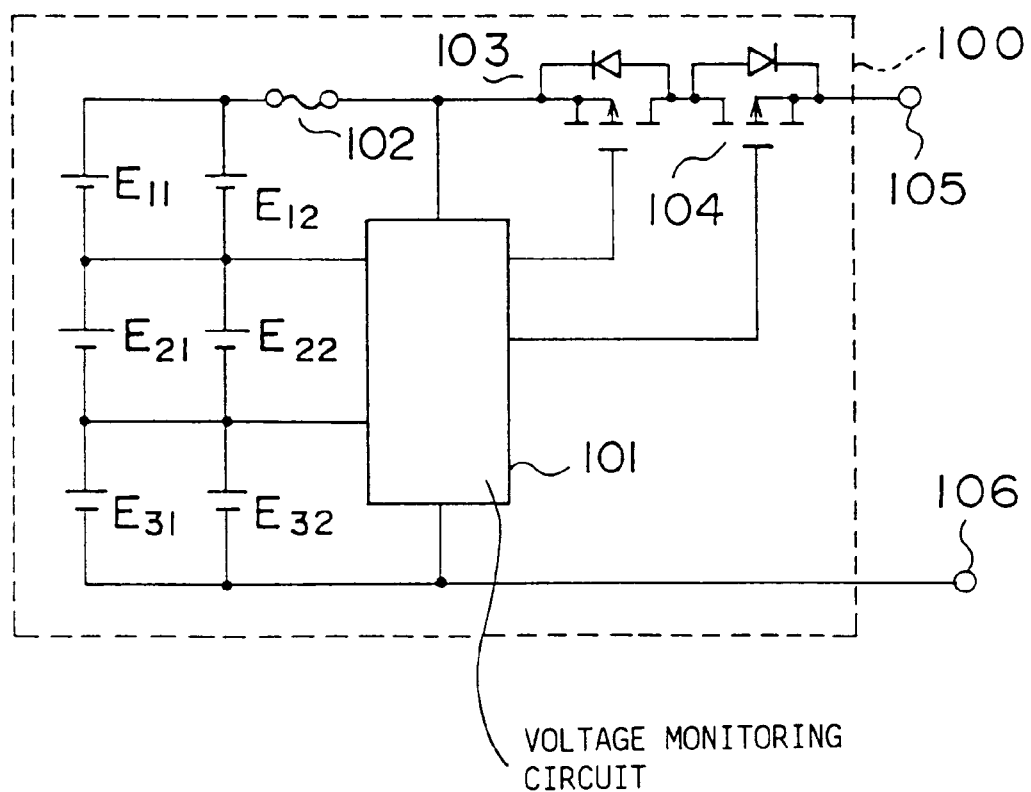
FIG. 1 is a circuit diagram showing an example of a conventional battery unit.

Each of voltage monitoring circuits 2-1, 2—2 and 2-3 has the same construction as the voltage monitoring circuit 101 shown in FIG. 1. Hence, it is possible to form the protection circuit at a low cost by utilizing an existing voltage monitoring circuit. For example, the voltage monitoring circuits 2-1, 2—2 and 2-3 are made up of an integrated circuit (IC) chip MM1309 manufactured by Mitsumi Electric Co., Ltd. of Japan. An output of an OR circuit 124 within the voltage monitoring circuit 2-1, an output of an OR circuit 124 within the voltage monitoring circuit 2—2 and an output of an OR circuit 124 within the voltage monitoring circuit 2-3 are supplied to an OR circuit 41-1, and FETs 5, 7 and 7-1 are controlled by an output of this OR circuit 41-1. In addition, an output of an OR circuit 114 within the voltage monitoring circuit 2-1, an output of an OR circuit 114 within the voltage monitoring circuit 2—2 and an output of an OR circuit 114 within the voltage monitoring circuit 2-3 are supplied to an OR circuit 42-1, and FETs 6, 8 and 8-1 are controlled by an output of this OR circuit 42-1.

When the voltage of one of the battery cells E11, E21 and E31 becomes less than or equal to the reference voltage e1, a high-level signal is applied to the FETs 5, 7 and 7-1 via the OR circuit 124 within the voltage monitoring circuit 2-1 and the OR circuit 41-1, thereby turning the FETs 5, 7 and 7-1 OFF and preventing the excessive discharge by cutting off a discharge current from a battery unit 1B. Similarly, when the voltage of one of the battery cells E12, E22 and E32 becomes less than or equal to the reference voltage e1, a high-level signal is applied to the FETs 5, 7 and 7-1 via the OR circuit 124 within the voltage monitoring circuit 2—2 and the OR circuit 41-1, thereby turning the FETs 5, 7 and 7-1 OFF and preventing the excessive discharge by cutting off the discharge current from the battery unit 1B. Further, when the voltage of one of the battery cells E13, E23 and E33 becomes less than or equal to the reference voltage e1, a high-level signal is applied to the FETs 5, 7 and 7-1 via the OR circuit 124 within the voltage monitoring circuit 2-3 and the OR circuit 41-1, thereby turning the FETs 5, 7 and 7-1 OFF and preventing the excessive discharge by cutting off the discharge current from the battery unit 1B.

On the other hand, when the voltage of one of the battery cells E11, E21, E31, E12, E22, E32, E13, E23 and E33 becomes greater than the reference voltage e1, a low-level signal is applied to the FETs 5, 7 and 7-1 via the OR circuit 41-1, thereby turning the FETs 5, 7 and 7-1 ON. As a result, the discharge current from the battery unit 1B flows to the power supplying terminals 9 and 10, and the discharge of the battery unit 1B is enabled.

When the voltage of one of the battery cells E11, E21 and E31 becomes greater than or equal to the reference voltage e2, a high-level signal is applied to the FETs 6, 8 and 8-1 via the OR circuit 114 of the voltage monitoring circuit 2-1 and the OR circuit 42-1, thereby turning the FETs 6, 8 and 8-1 OFF and preventing the excessive charging by cutting off a charging current to the battery unit 1B. Similarly, when the voltage of one of the battery cells E12, E22 and E32 becomes greater than or equal to the reference voltage e2, a high-level signal is applied to the FETs 6, 8 and 8-1 via the OR circuit 114 of the voltage monitoring circuit 2—2 and the OR circuit 42-1, thereby turning the FETs 6, 8 and 8-1 OFF and preventing the excessive charging by cutting off the charging current to the battery unit 1B. Further, the voltage of one of the battery cells E13, E23 and E33 becomes greater than or equal to the reference voltage e2, a high-level signal is applied to the FETs 6, 8 and 8-1 via the OR circuit 114 of the voltage monitoring circuit 2-3 and the OR circuit 42-1, thereby turning the FETs 6, 8 and 8-1 OFF and preventing the excessive charging by cutting off the charging current to the battery unit 1B.

On the other hand, when the voltage of one of the battery cells E11, E21, E31, E12, E22, E32, E13, E23 and E33 becomes less than the reference voltage e2, a low-level signal is applied to the FETs 6, 8 and 8-1 via the OR circuit 42-1, thereby turning the FETs 6, 8 and 8-1 ON. As a result, a charging current to the battery unit 1B flows to the battery cells E11, E21, E31, E12, E22, E32, E13, E23 and E33 via the power supplying terminals 9 and 10, and the charging of the battery unit 1B is enabled.

Figure 8:
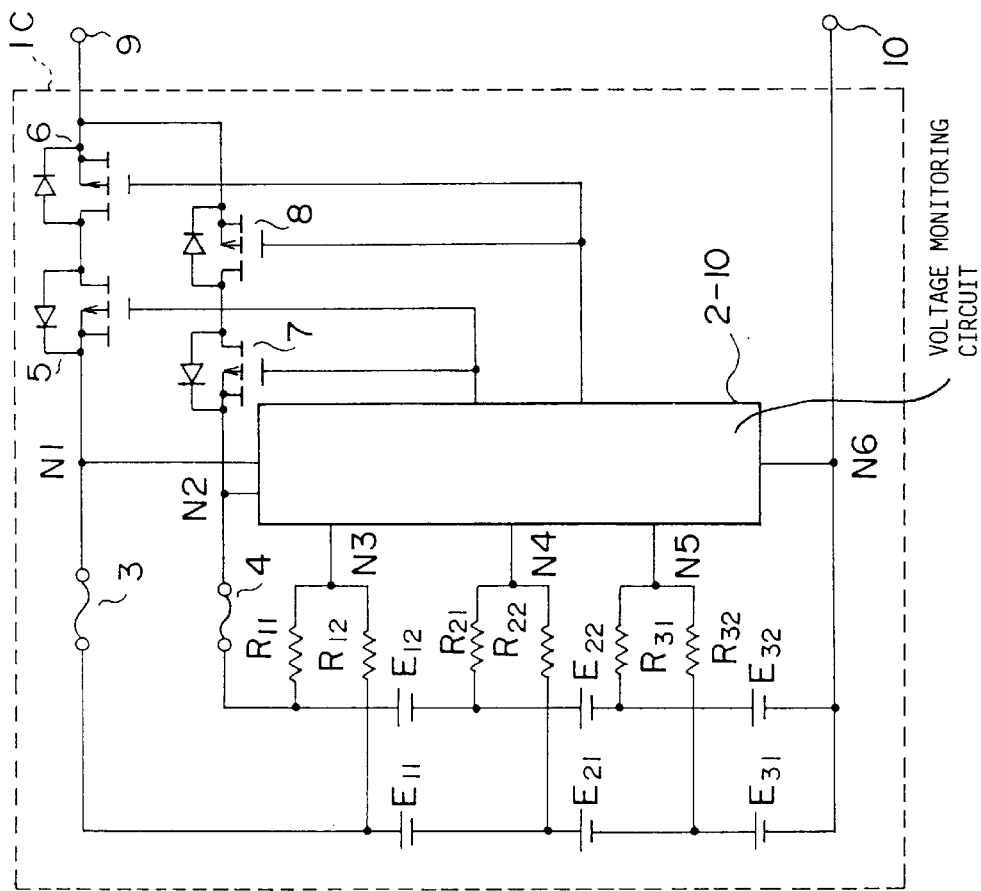
FIG. 8 is a circuit diagram showing a fourth embodiment of the battery unit according to the present invention.

Next, a description will be given of a fourth embodiment of the battery unit according to the present invention, by referring to FIG. 8. This fourth embodiment of the battery unit employs a fourth embodiment of the protection circuit according to the present invention. In FIG. 8, those parts which are the same as those corresponding parts in FIG. 3 are designated by the same reference numerals, and a description thereof will be omitted.

In the first embodiment described above, the voltages of all of the battery cells provided within the battery unit 1 are monitored, and the voltage monitoring circuit 2 used is capable of monitoring a number of voltages equal to the number of battery cells provided within the battery unit 1. In addition, in the second and third embodiments, the number of voltage monitoring circuits 2-1, 2—2 and/or 2-3 used is the same as the number of battery cells connected in parallel within the corresponding battery units 1A and 1B.

On the other hand, in this fourth embodiment, voltages are monitored by separating battery cells connected in parallel within a battery unit 1C by high-resistance elements, so as to avoid a current loop from being generated among the battery cells which are connected in parallel.

In FIG. 8, a voltage monitoring circuit 2-10 has the same construction as the voltage monitoring circuit 101 shown in FIG. 1. Hence, it is possible to form the protection circuit at a low cost by utilizing an existing voltage monitoring circuit. However, four stages of comparator circuits are provided in each of the excessive discharge preventing system and the excessive charging preventing system. For example, the voltage monitoring circuit 2-10 is made up of an integrated circuit (IC) chip MM1309 manufactured by Mitsumi Electric Co., Ltd. of Japan.

Figure 9:
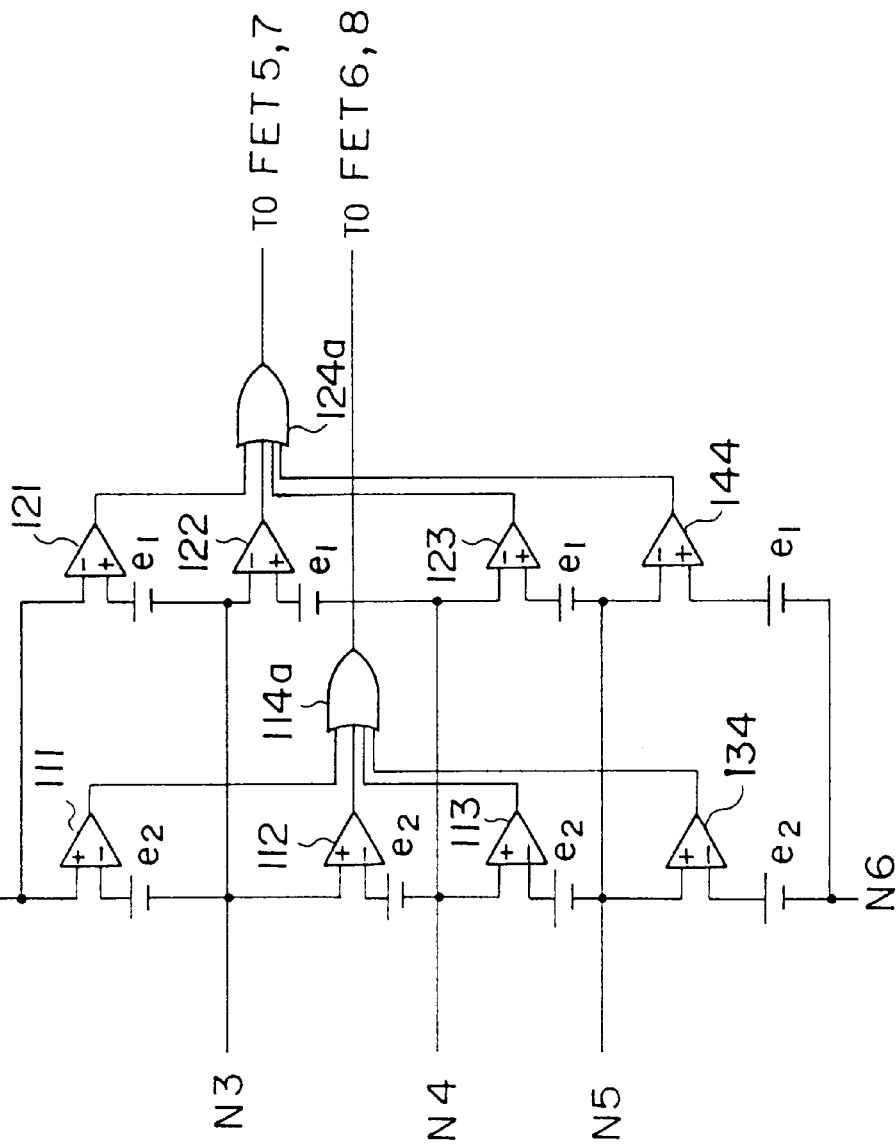
FIG. 9 is a circuit diagram showing a voltage monitoring circuit of the fourth embodiment.

FIG. 9 is a circuit diagram showing the construction of the voltage monitoring circuit 2-10. The voltage monitoring circuit 2-10 includes comparator circuits 111 through 113, 134, 121 through 123 and 144, and OR circuits 114a and 124a which are connected as shown in FIG. 9. One input of each of the comparator circuits 111 and 121 is connected to nodes 35 N1 and N2. One input of each of the comparator circuits 112 and 122 is connected to a node N3. One input of each of the comparator circuits 113 and 123 is connected to a node N4. One input of each of the comparator circuits 134 and 144 is connected to a node N5. The other input of each of the comparator circuits 134 and 144 is connected to a node N6 via corresponding reference voltages e2 and e1. In addition, an output of the OR circuit 124a controls the FETs 5 and 7, and an output of the OR circuit 114a controls the FETs 6 and 8.

The node N3 connects resistor elements R11 and R12. The resistor element R11 is connected to the battery cell E12, and the resistor element R12 is connected to the battery cell E11. The node N4 connects the resistor elements R21 and R22. The resistor element R21 is connected to a node connecting the battery cells E12 and E22, and the resistor element R22 is connected to a node connecting the battery cells E11 and E21. The node N5 connects resistor elements R31 and R32. The resistor element R31 is connected to a node connecting the battery cells E22 and E32, and the resistor element R32 is connected to a node connecting the battery cells E21 and E31.

The resistor element R11 is provided to limit the current when monitoring the voltage of the battery cell E12, and the resistor element R12 is provided to limit the current when monitoring the voltage of the battery cell E11. Similarly, the resistor element R21 is provided to limit the current when monitoring the voltage of the battery cell E22, and the resistor element R22 is provided to limit the current when monitoring the voltage of the battery cell E21. In addition, the resistor element R31 is provided to limit the current when monitoring the voltage of the battery cell E32, and the resistor element R32 is provided to limit the current when monitoring the voltage of the battery cell E31.

Figure 10:
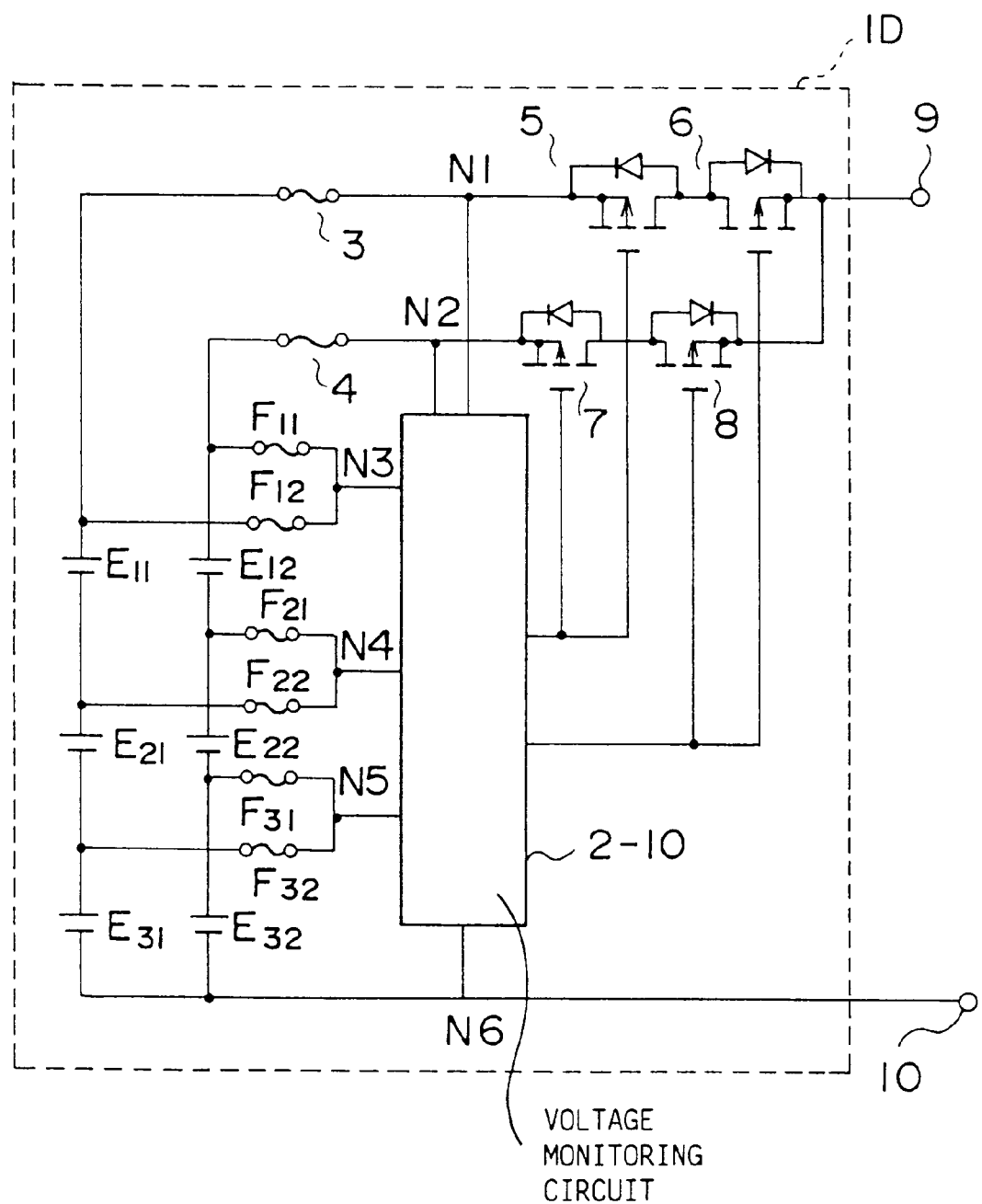
FIG. 10 is a circuit diagram showing a fifth embodiment of the battery unit according to the present invention.

Next, a description will be given of a fifth embodiment of the battery unit according to the present invention, by referring to FIG. 10. This fifth embodiment of the battery unit employs a fifth embodiment of the protection circuit according to the present invention. In FIG. 10, those parts which are the same as those corresponding parts in FIG. 8 are designated by the same reference numerals, and a description thereof will be omitted.

In this embodiment, voltages are monitored by separating battery cells connected in parallel within a battery unit 1D by fuses, so as to avoid a current loop from being generated among the battery cells which are connected in parallel. More particularly, fuses F11 through F32 are provided in place of the resistor elements R11 through R32 shown in FIG. 8.

In each of the embodiments described above, the Li⁺ battery cells are provided within the battery unit. However, the battery cells of the battery unit are of course not limited to the Li⁺ battery cells.

Figure 11:
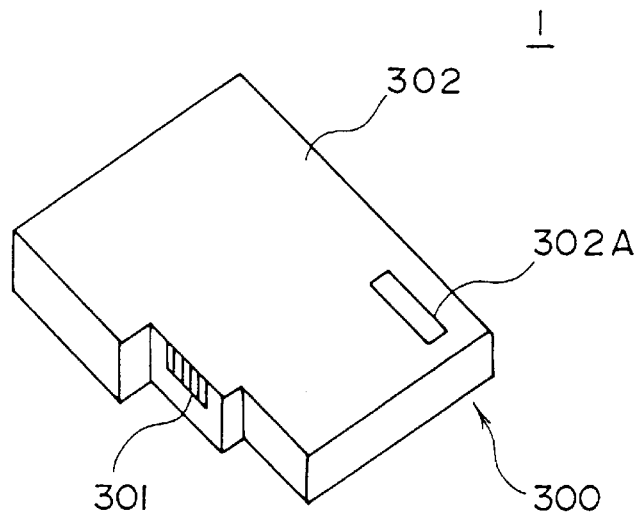
FIG. 11 is a perspective view showing the external appearance of the battery unit according to the present invention.

FIG. 11 is a perspective view showing the external appearance of the battery unit according to the present invention. For the sake of convenience, FIG. 11 shows the first embodiment of the battery unit, that is, the battery unit 1. In FIG. 11, the battery unit 1 is made up of a housing 300 with a terminal part 301 and a cover 302. The power supplying terminals 9 and 10 and the like are provided in the terminal part 301. The cover 302 includes a window 302A through which the states of the fuses 3 and 4 and the like can be visually confirmed.

Figure 12:
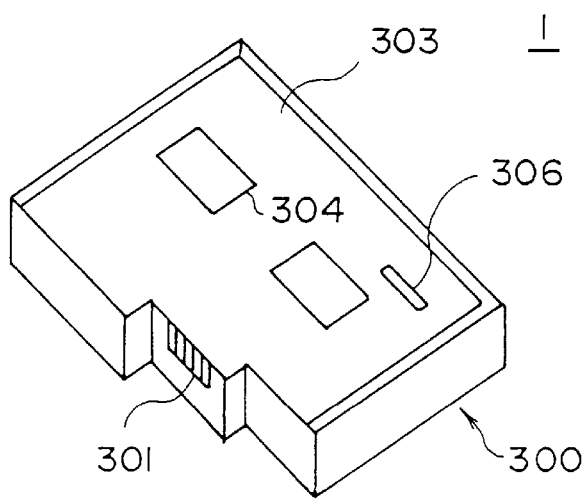
FIG. 12 is a perspective view showing the battery unit in a stage where a cover is removed.

FIG. 12 is a perspective view showing the battery unit 1 in a state where the cover 302 shown in FIG. 11 is removed. In FIG. 12, an IC chip 304, a fuse part 306 and the like are provided on a substrate 303. The IC chip 304, the fuse part 306 and the like are connected by wiring patterns (not shown). For example, the voltage monitoring circuit 2 is provided within the IC chip 304. In addition, the fuses 3 and 4 and the like are provided in the fuse part 306.

Figure 13:
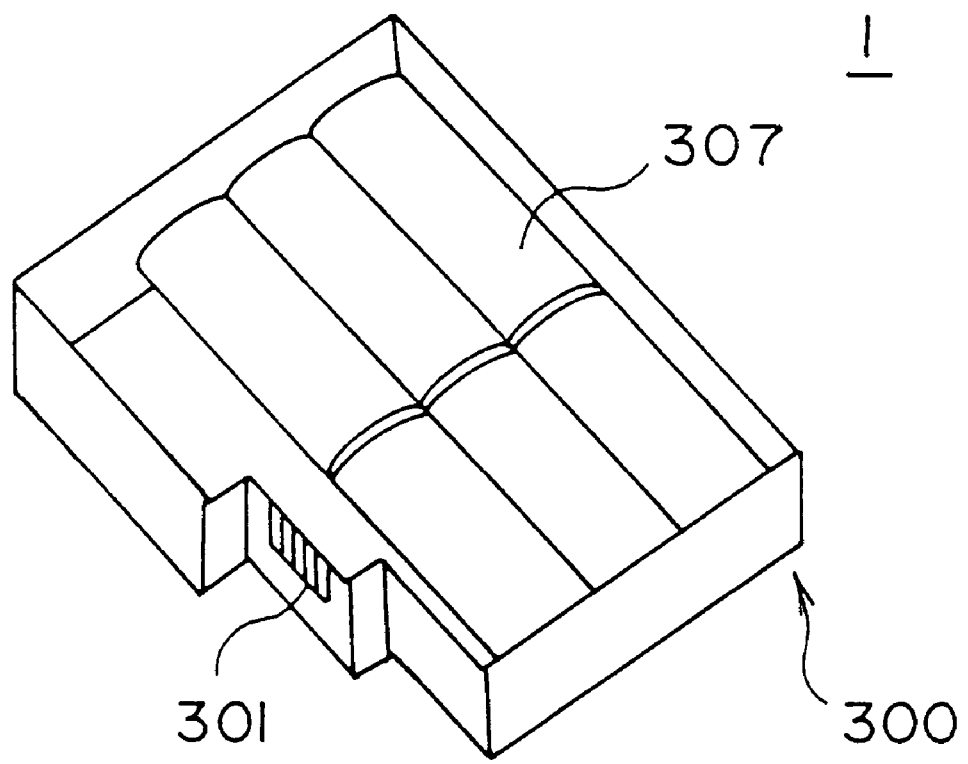
FIG. 13 is a perspective view showing the battery unit in a state where a substrate is removed.

FIG. 13 is a perspective view showing the battery unit 1 in a state where the substrate 303 shown in FIG. 12 is removed. In FIG. 13, six battery cells 307 correspond to the battery cells E11 through E32 shown in FIGS. 3 and 4.

Of course, the shape of the battery unit is not limited to that shown in FIGS. 11 through 13 described above.

Further, the present invention is not limited to these embodiments, but various variations and modifications may be made without departing from the scope of the present invention.

What is claimed is:

1. A protection circuit for use with a battery unit which has a plurality of cell parts coupled in parallel and power supplying terminals, each of the cell parts including a plurality of battery cells coupled in series and terminals respectively coupled to the power supplying terminals, said protection circuit comprising:
a switching element which makes an electrical connection to the power supplying terminal, and disconnects the electrical connection in response to a signal; and
a monitoring circuit which outputs the signal to said switching element when a voltage of at least one battery cell of one cell part falls outside a predetermined range, so that no current is supplied from said one cell part to other cell parts.

2. The protection circuit as claimed in claim 1, wherein said monitoring circuit is provided independently with respect to each of the cell parts, and includes a signal output circuit which outputs a signal to each battery cell of a corresponding one of the cell parts when a voltage of a battery cell of the corresponding cell part falls outside the predetermined range.

3. The protection circuit as claimed in claim 2, wherein said monitoring circuit further includes a logical sum circuit which outputs to said switching element a logical sum of signals output from said signal output circuit with respect to each of the battery cells within the corresponding call part.

4. The protection circuit as claimed in claim 1, wherein said monitoring circuit includes first and second resistors which are connected in series and couple terminals of corresponding battery cells among different cell parts, and a circuit which outputs the signal to said switching element when a voltage at a node which connects said first and second resistors fall outside said predetermined range.

5. The protection circuit as claimed in claim 1, wherein said monitoring circuit includes first and second fuses which are connected in series and couple terminals of corresponding battery cells among different cell parts, and a circuit which outputs the signal to said switching element when a voltage at a node which connects said first and second fuses fall outside said predetermined range.

6. The protection circuit as claimed in claim 2, wherein said switching element is provided with respect to each said monitoring circuit.

7. The protection circuit as claimed in claim 1, wherein said predetermined range is set, based on a tolerable range of at least one of discharging and charging of the battery cells.

8. A protection circuit for use with a battery unit which has a plurality of cell parts coupled in parallel and first and second power supplying terminals, each of the cell parts including a plurality of battery cells coupled in series, and first and second terminals respectively coupled to the first and second power supplying terminals, said protection circuit comprising:
a switching element which makes an electrical connection to the first terminal of a corresponding one of the cell parts and to the first power supplying terminal, and disconnects the electrical connection in response to an active signal;
a resistor which couples terminals of corresponding battery cells among different cell parts; and
a circuit which outputs to said switching element a signal which becomes active when a voltage from said resistor falls outside a predetermined range.

9. The protection circuit as claimed in claim 8, wherein said resistor includes first and second resistors which are connected in series and couple the terminals of the corresponding battery cells among the different cell parts, and said circuit outputs to said switching element a signal which becomes active when a voltage at a node connecting said first and second resistors falls outside the predetermined range.

10. A protection circuit for use with a battery unit which has a plurality of cell parts coupled in parallel and first and second power supplying terminals, each of the cell parts including a plurality of battery calls coupled in series, and first and second terminals respectively coupled to the first and second power supplying terminals, said protection circuit comprising:
a switching element which makes an electrical connection to the first terminal of a corresponding one of the cell parts and to the first power supplying terminal, and disconnects the electrical connection in response to an active signal;
a fuse which couples terminals of corresponding battery cells among different cell parts; and
a circuit which outputs to said switching element a signal which becomes active when a voltage from said fuse falls outside a predetermined range.

11. The protection circuit as claimed in claim 10, wherein said fuse includes first and second fuses which are connected in series and couple the terminals of the corresponding battery cells among the different cell parts, and said circuit outputs to said switching element a signal which becomes active when a voltage at a node connecting said first and second fuses falls outside the predetermined range.

12. A protection circuit for use with a battery unit which has a plurality of series-connected battery cells coupled in parallel, comprising:
   a short-circuit detection circuit which detects a short-circuit of a battery cell with respect to each of the plurality of battery cells; and
   a circuit which cuts off a current supply to an arbitrary battery cell from another battery cell when said short-circuit detection circuit detects a short-circuit of said arbitrary battery cell from among the plurality of battery cells.

13. A protection circuit for use with a battery unit which has a plurality of battery calls coupled in parallel, comprising:
   a monitoring circuit which monitors a voltage of each of the battery cells; and
   a stop circuit which stops discharging or charging of each of the battery cells when said monitoring circuit monitors a voltage which falls outside a predetermined range in an arbitrary battery cell from among the battery cells.

14. The protection circuit as claimed in claim 13, wherein the battery unit has a plurality of battery cell groups coupled in parallel, and each of the battery cell groups includes a plurality of battery cells coupled in series.

15. The protection circuit as claimed in claim 13, which further comprises:
   a discharging or charging prevention switch; and
   said stop circuit controls said discharging or charging prevention switch.

16. The protection circuit as claimed in claim 15, wherein:
   the battery unit has a plurality of battery cell groups coupled in parallel, and each of the battery cell groups includes a plurality of battery cells coupled in series; and
   said discharging or charging prevention switch is provided with respect to each of said battery cell groups.

17. The protection circuit as claimed in claim 16, wherein:
   said monitoring circuit is provided independently with respect to each of said battery cell groups; and
   each of said monitoring circuits notifies a discharging or charging prevention switch which is provided with respect to a battery cell group other than a corresponding battery cell group when a voltage which falls outside the predetermined range is monitored in an arbitrary battery cell of the corresponding battery cell group.

18. A protection circuit for use with a battery unit which has a plurality of cell parts coupled in parallel and power supplying terminals, each of the cell parts including a plurality of battery cells coupled in series and terminals respectively coupled to the power supplying terminals, said protection circuit comprising:
   a monitoring circuit which detects whether or not a voltage of at least one of the battery cells of one cell part falls outside a predetermined range.

19. The protection circuit as claimed in claim 18, which further comprises:
   a switching element provided between the terminal of each of the cell parts and the power supplying terminal, and
   said monitoring circuit controls said switching element.

20. The protection circuit as claimed in claim 19, wherein said monitoring circuit is provided independently with respect to each of the call parts, and comprises:
   a signal output circuit which outputs to each battery cell, of a corresponding one of the cell parts, a signal which becomes active when a voltage of a battery cell of the corresponding cell part falls outside the predetermined range; and
   a logical sum circuit which outputs to said switching element a logical sum of signals output from said signal output circuit with respect to each of the battery cells within the corresponding cell part.

21. The protection circuit as claimed in claim 18, wherein said predetermined range is set, based on a tolerable range of at least one of discharging and charging of the battery cells.

22. A protection circuit for use with a battery unit which has a plurality of cell parts coupled in parallel and power supplying terminals, each of the cell parts including a plurality of battery cells coupled in series and terminals respectively coupled to the power supplying terminals, said protection circuit comprising:
   a resistor which couples terminals of corresponding battery cells among different cell parts; and
   a signal output circuit which outputs a signal which becomes active when a voltage from said resistor falls outside a predetermined range and instructs disconnection of an electrical connection between the terminal of the cell parts and the power supplying terminal.

23. A protection circuit for use with a battery unit which has a plurality of cell parts coupled in parallel and power supplying terminals, each of the cell parts including a plurality of battery cells coupled in series and terminals respectively coupled to the power supplying terminals, said protection circuit comprising;
   a fuse which couples terminals of corresponding battery cells among different cell parts; and
   a signal output circuit which outputs a signal which becomes active when a voltage from said fuse falls outside a predetermined range and instructs disconnection of an electrical connection between the terminal of the cell parts and the power supplying terminal.

24. A protection circuit for use with a battery unit which has a plurality of series-connected battery cells coupled in parallel, comprising:
   a short-circuit detection circuit which detects a short-circuit of a battery cell with respect to each of the plurality of battery cells; and
   a circuit which outputs a signal which instructs a current supply, to an arbitrary battery cell from another battery cell, to be cut off when said short-circuit detection circuit detects a short-circuit of said arbitrary battery cell from among the plurality of battery cells.

25. A protection circuit for use with a battery unit which has a plurality of battery cells coupled in parallel, comprising:
   a monitoring circuit which monitors a voltage of each of the battery cells:
   an instruction circuit which outputs an instruction signal which instructs discharge or charging of each of the battery cells to stop when said monitoring circuit monitors a voltage which falls outside a predetermined range in an arbitrary one of the battery cells.

26. The protection circuit as claimed in claim 25, wherein:
   the battery unit has a plurality of battery call groups coupled in parallel; and
   each of the battery cell groups includes a plurality of battery cells coupled in series.

27. The protection circuit as claimed in claim 25, which further comprises:

a discharging or charging prevention switch, said instruction circuit controlling said discharge or charging prevention switch by the instruction signal.

28. The protection circuit as claimed in claim 27, wherein:

the battery unit has a plurality of battery cell groups coupled in parallel and each of the battery cell groups includes a plurality of battery cells coupled in series; and said discharging or charging prevention switch is provided with respect to each of the battery cell groups.

29. The protection circuit as claimed in claim 28, wherein:

said monitoring circuit is provided individually with respect to each of the battery cell groups; and each said monitoring circuit notifies a discharging or charging prevention switch, which is provided with respect to a battery cell group other than a corresponding battery cell group, when a voltage which falls outside the predetermined range is monitored in an arbitrary battery cell of the corresponding battery cell group.

30. A protection circuit for use with a battery unit which has a plurality of series-connected battery cells coupled in parallel and a resistor coupling battery cells which have identical potentials in parallel, comprising;

a circuit which outputs a signal which instructs discharging or charging of the battery cells to be prohibited when a voltage from said resistor falls outside a predetermined range.

31. A battery unit comprising:

a plurality of cell parts coupled in parallel, each of said cell parts having first and second terminals and a plurality of battery calls coupled in series;

a first power supplying terminal coupled to the first terminal of each of said cell parts;

a second power supplying terminal coupled to the second terminal of each of said cell parts;

a plurality of switching elements, each of said switching elements making an electrical connection to the first terminal of a corresponding one of said cell parts and the first power supplying terminal and disconnecting the electrical connection in response to an active signal; and a monitoring circuit which outputs a signal to said switching elements, which signal becomes active when a voltage of at least one of the battery cells of one cell part falls outside a predetermined range.

32. The battery unit as claimed in claim 31, wherein said monitoring circuit is provided independently with respect to each of the cell parts and includes a signal output circuit which outputs a signal to each battery cell of a corresponding one of the cell parts when a voltage of a battery cell of the corresponding cell part falls outside the predetermined range.

33. The battery unit as claimed in claim 32, wherein said monitoring circuit further includes a logical sum circuit which outputs, to a corresponding one of said switching elements, a logical sum of signals output from said signal output circuit with respect to each of the battery cells within the corresponding cell part.

34. The battery unit as claimed in claim 31, wherein said monitoring circuit includes first and second resistors which are connected in series and couple terminals of corresponding battery cells among different cell parts, and a circuit which outputs the signal to a corresponding one of said switching elements when a voltage, at a node which connects said first and second resistors, falls outside said predetermined range.

35. The battery unit as claimed in claim 31, wherein said monitoring circuit includes first and second fuses which are connected in series and couple terminals of corresponding battery cells among different cell parts, and a circuit which outputs the signal to a corresponding one of said switching elements when a voltage, at a node which connects said first and second fuses, falls outside said predetermined range.

36. The battery unit as claimed in claim 32, wherein each of said switching elements is provided with respect to each said monitoring circuit.

37. The battery unit as claimed in claim 31, wherein said predetermined range is set based on a tolerable range of at least one of discharging and charging of the battery cells.

38. A battery unit having a plurality of series-connected battery cells coupled in parallel, comprising:

a resistor which couples battery cells, which have identical potentials, in parallel, said resistor limiting a current flow between the battery cells coupled in parallel and preventing a current flow to an arbitrary battery cell from another battery cell when the arbitrary battery cell is short-circuited.

39. A battery unit having a plurality of series-connected battery cells coupled in parallel, comprising:

a fuse which couples battery cells, which have identical potentials, in parallel, said fuse limiting a current flow between the battery cells coupled in parallel and preventing a current flow to an arbitrary battery cell from another battery cell when the arbitrary battery cell is short-circuited.

40. A battery protection method for protecting a battery unit having a plurality of series-connected battery cells coupled in parallel, comprising;

a detection step detecting a short-circuit of a battery cell with respect to each of the battery cells; and an instruction step instructing a cut off of a current supply to an arbitrary battery cell from another battery cell when said detection detects a short-circuit in the arbitrary battery cell among the plurality of battery cells.

41. A battery protection method for protecting a battery unit having a plurality of battery cells coupled in parallel, comprising:

monitoring a voltage of each of the battery cells; and instructing an end of discharging or of charging of each of the battery cells when a voltage, which falls outside a predetermined range, is identified when monitoring an arbitrary battery cell.

42. The battery protection method as claimed in claim 41, wherein the battery unit has a plurality of battery cell groups coupled in parallel, and each of the battery cell groups includes a plurality of battery cells coupled in series.

43. The battery protection method as claimed in claim 41, which further comprises:

a discharging or charging prevention step; and said instructing step controlling said discharging or charging prevention step based on the instruction.

44. The battery protection method as claimed in claim 43, wherein the battery unit has a plurality of battery cell groups coupled in parallel and each of the battery cell groups includes a plurality of battery cells coupled in series, further comprising:

performing said discharge or charging prevention step being carried out with respect to each of said battery cell groups.

45. The battery protection method as claimed in claim 44, further comprising:

performing said monitoring step with respect to each of said battery call groups; and notifying the discharging or charging prevention step which is carried out with respect to a battery cell group, other than a corresponding battery cell group, when a voltage which falls outside the predetermined range is monitored in the arbitrary battery cell of the corresponding battery cell group.

46. A battery protection method for protecting a battery unit having a plurality of series-connected battery cells coupled in parallel, and a resistor coupling battery cells which have identical potentials in parallel, comprising:

making an instruction prohibiting discharging or charging of each of the battery cells when a voltage from the resistor falls outside a predetermined range.

* * * * *

UNITED STATES PATENT AND TRADEMARK OFFICE
CERTIFICATE OF CORRECTION

PATENT NO.: 6,051,955
DATED : April 18, 2000
INVENTOR(S): Mitsuo SAEKI et al.

It is certified that error appears in the above-identified patent and that said Letters Patent is hereby corrected as shown below:

On the title page, [56] References Cited, U.S. Patent Documents, add:

5,438,250    8/1995    Retzlaff    320/128

Signed and Sealed this

Twenty-seventh Day of February, 2001

Attest:

NICHOLAS P. GODICI

Attesting Officer

Acting Director of the United States Patent and Trademark Office